Sept. 26, 1933.  A. KREMSER  1,928,225
METHOD OF FRACTIONATION
Filed April 18, 1928
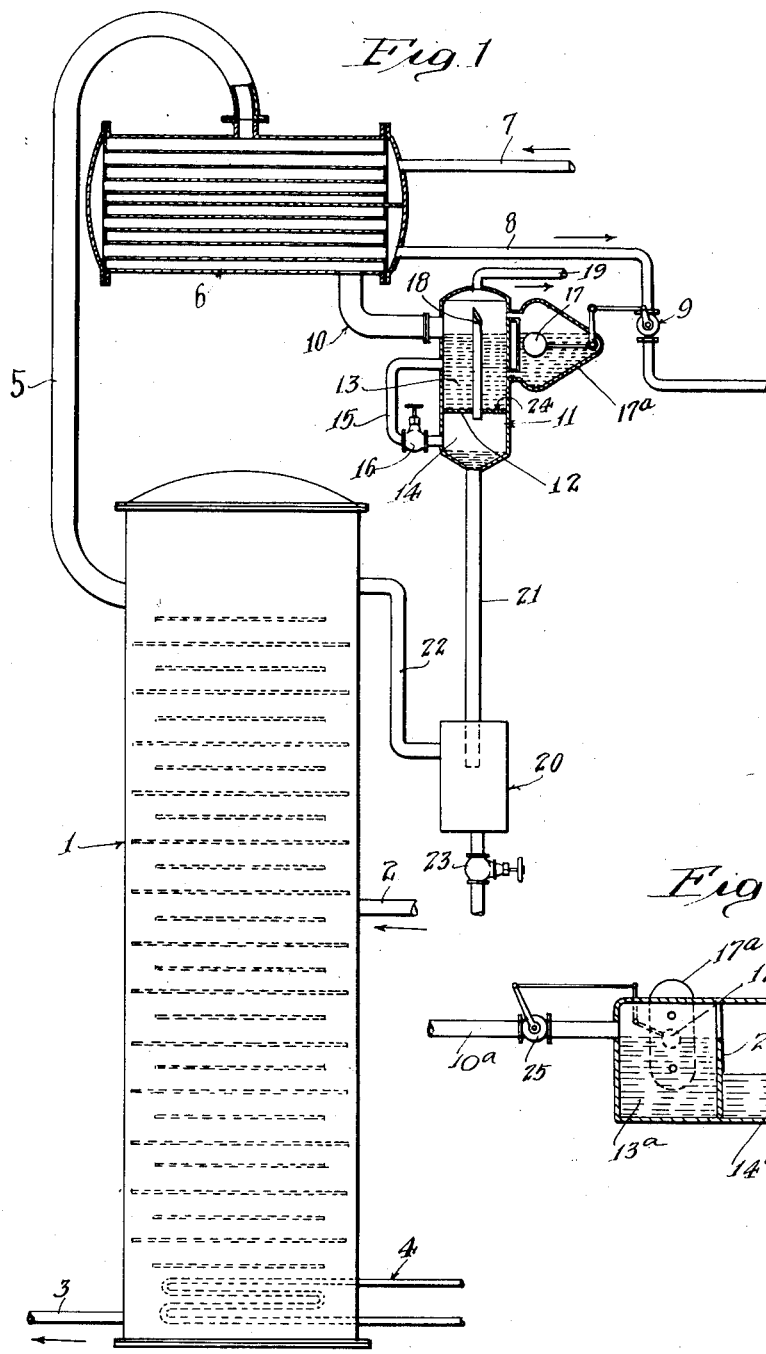
Inventor
Alois Kremser
By Lyon & Lyon
Attorneys Patented Sept. 26, 1933

1,928,225

UNITED STATES PATENT OFFICE 1,928,225

METHOD OF FRACTIONATION

Alois Kremser, Berkeley, Calif., assignor to Standard Oil Company of California, San Francisco, Calif., a corporation of Delaware Application April 18, 1928. Serial No. 271,098

10 Claims. (Cl. 196—139)

This invention relates to a method of fractionating, dephlegmating or rectifying liquid. The method is particularly designed for those fractionating, dephlegmating or rectifying operations wherein it is desired to control the condensation of vapors and return a substantially constant quantity of condensed vapors as reflux.

An object of this invention is to disclose a method of fractionating liquids. An object is to disclose a method of fractionating whereby a substantially constant and uniform quantity of liquid is refluxed. Another object is to provide a method of fractionating liquids whereby a uniform product of heavier fractions of a mixture is obtained.

Although the apparatus herein disclosed and the methods hereinafter described are applicable to a number of uses and different operations, the apparatus and the method in which the apparatus may be used will be specifically described as pertaining to the fractionation of mixed boiling point constituents. In other words, although the apparatus may be used wherever it is desired to regulate and control the flow of liquids, (such liquids being oils, aqueous solutions of salt, alcohols, alcoholic solutions and mixtures, etc.) it will be particularly described as adapted for automatically controlling the rate of reflux in a fractionating apparatus, particularly in a fractionating apparatus run to produce a bottom stock of constant composition and to eliminate overhead the undesirable components of the feed stock.

In various industrial operations, it is often desired to make more or less perfect separation of several components of a liquid. This is particularly true in industries relating to the manufacture and treatment of oils, alcohols, acetic acid, acetone, etc. For example, in the petroleum industry the material handled is a complex mixture of a number of mutually soluble hydrocarbons whose boiling points, specific gravity, viscosity and other properties may vary over a considerable range. While it is seldom required to isolate any one of these components in a pure state, nevertheless in order to produce oil for the various purposes to which their properties adapt them, it is necessary to make a more or less narrow segregation of several classes of hydrocarbons or components occurring in a natural petroleum oil or a portion thereof. In the course of refining, it is the usual practice to make not one but several such operations. In general, the only practical method of making this kind of a separation is by fractional distillation.

Fractionation is usually accomplished in some form of apparatus adapted to secure interfacial contact between liquid and vapors through a zone in which a temperature gradient is maintained. Ordinarily such an apparatus takes the form of a tower provided with transverse plates holding pools of liquid through which the vapors bubble, or packed with solid bodies over the surface of which the liquid is allowed to flow. A heat exchanger or cooling coil is generally provided near the vapor outlet from the tower so as to cause condensation of a portion of the vapors, this condensate being allowed to reflux and run downwardly in the tower countercurrent to the uprising vapors, thus establishing the temperature gradient mentioned above.

This refluxing zone may be a separate piece of apparatus, in which case the vapors from the top of the tower pass through the reflux zone and the condensate formed therein is led back to near the top of the tower.

Fractionation may be of two general types, according to the object to be accomplished. If it is desired to separate and obtain as a uniform product certain lighter fractions of a mixture, the desired fraction will be driven overhead as a vapor and condensed substantially free of any of the undesirable heavier components of the original mixture. The rejected portion will be withdrawn from a point near the base of the tower, or generally speaking, from the point of the apparatus at which the highest temperature exists. In this way the rejected portion may vary considerably in composition, particularly if the composition of the feed stock varies. In view of the fact that a product of uniform volatility is desired, it is necessary to maintain a substantially constant temperature and pressure at the vapor outlet from the fractionating zone. The temperature of the residuum outlet or rejected portion may be maintained only sufficiently high to insure against the withdrawal of the desired fractions at that point. The residuum or rejected portion of the feed comprises all of the oil or other liquid which is unvaporized together with those portions of the condensate which lie outside the desired limits of separation.

The second type of fractionation is that in which it is desired to separate and obtain as a uniform product certain heavier fractions of a mixture.

In this case the desired fraction will be withdrawn as a bottom product from a point near the base of the tower while the rejected portion of lighter constituents or fractions will be driven overhead as a vapor substantially free from any of the desired heavier components of the original mixture. During this operation it is desired to maintain a constant temperature and pressure condition at the liquid outlet at the bottom. As a consequence, the rejected portion, that is the vapors from the top of the column, will vary in composition and therefore in volatility with every variation in the quality of the feed. If an attempt were made to maintain a constant temperature, operating conditions would vary between the extremes of too little reflux or excess of reflux even to the point of flooding the column. Equilibrium would be disturbed continually and fractionation would be inefficient.

Consequently in this type of run the aim is to maintain a constant temperature at the liquid outlet from the bottom and a constant reflux rate at the vapor outlet. The temperature at the vapor outlet need be maintained only sufficiently low to insure an adequate amount of reflux. In order to maintain this constant reflux rate, it is necessary to regulate the amount of cooling liquid flowing through the reflux condenser. Whenever the rate or composition of feed or other operating conditions in general have a tendency to vary, it is extremely difficult and laborious to maintain a constant reflux rate by manual control of the amount of cooling liquid flowing through the reflux condenser. One of the objects of this invention is to provide a method of fractionating whereby a constant reflux rate is obtained automatically. This results in a much more even and efficient operation than could be secured by the best manual control.

In order to clearly illustrate the method of fractionating described above in a general manner and an apparatus adapted to regulate the flow of reflux or other liquids, reference will be made to the attached drawing which shows one form of apparatus as applied to a fractionating column.

In the drawing:

Figure 1 is a diagrammatic representation and cross section of a fractionating tower, reflux condenser and an automatic liquid flow regulating device;

Figure 2 shows a modified form of liquid flow regulating apparatus.

In the drawing, 1 represents a form of fractionating apparatus which may consist of a vertical tower having a feed inlet 2 and liquid outlet 3. Near the base of the tower a suitable heating means is positioned, for example, a closed coil 4 through which steam, hot oil or other heating means is circulated. The portion of the tower above the heating element 4 may be of any suitable structure, for example, it may contain bubble plates, perforated plates or solid packing material such as rock, tile or the like adapted to cause contact of oil and vapors within the tower. A vapor line 5 is provided to conduct the vapors from the top of the tower to a reflux condenser 6 which may be of any suitable type, for example, a closed heat exchanger through which cooling fluid is circulated through the inlet pipe means 7 and outlet pipe means 8. The rate of flow of cooling fluid through the condenser 6 may be controlled by a valve 9 positioned in the outlet pipe 8.

Vapors liberated in the fractionating tower 1 pass into the reflux condenser 6 through the pipe 5 and are condensed therein, the condensed vapors passing through line 10 into a vessel 11 divided by a partition 12. Liquid from the reflux condenser 6 first passes into a chamber 13 and collects therein. The liquid in chamber 13 may be allowed to pass into a chamber 14 below the partition 12 through pipe means 15 having a valve 16 therein, said pipe means 15 connecting the upper chamber 13 and lower chamber 14. The upper chamber 13 is in communication with a float chamber 17a having a float 17 therein adapted to operate the valve 9 in pipe line 8 by any suitable means such as the link and lever shown. The vapor space above the liquid in chamber 13 is connected by means of a small pipe 18 with the lower chamber 14, thus equalizing the pressure in the two parts of the drum or vessel 11. A vapor outlet for uncondensed vapors present in the chamber 13 is provided at 19.

Liquid in the lower chamber 14 is allowed to flow downwardly into a water separating vessel, trap or liquid seal 20, by pipe means 21. From the water separating vessel or trap 20 the liquid is then allowed to enter or overflow into the upper portion of the fractionating tower 1 through line 22. The line 21 extends sufficiently low into the water separating vessel 20 so as to provide a liquid seal to prevent vapor from flowing back from the tower through lines 22 and 21 into the drum 11. Water separating in the chamber 20 may be withdrawn through a valve 23.

The partition or plate 12 separating the drum 11 into upper chamber 13 and lower chamber 14 may be provided with a small opening 24 which permits the drainage of water or other liquid from the upper chamber 13 into the lower chamber 14. If desired, the pipe means 15 and valve 16 connecting upper chamber 13 and lower chamber 14 may be eliminated and a valve placed in the opening 24 in partition 12.

In the operation of the apparatus described above, the valve 16 and float 17 are set so as to provide a sufficient flow of cooling water or other cooling liquid through the reflux condenser 6 under conditions of maximum vapor evolution in the fractionating zone 1. Once the operation is commenced, any increase in the amount of condensate entering the regulator through the line 10 will tend to raise the liquid level in the upper chamber 13 of the drum 11, that is, it will tend to raise the liquid head against the valve 16.

This rise in liquid level within the chamber 13 is transmitted to the float chamber 17a and this in turn will raise the float 17 which will transmit its motion to the valve 9 and close the valve to a certain extent, thus retarding the flow of cooling liquid through the reflux condenser 6. As the amount of cooling water passing through the reflux condenser 6 is thereby decreased, the amount of condensation occurring in the reflux condenser 6 is also reduced and a smaller quantity of condensate will pass from the condenser 6 into the upper chamber 13, thereby causing the liquid level in the chamber 13 and float chamber 17a to drop. If a decrease in the amount of condensate entering chamber 13 occurs, the liquid level in said chamber will drop and influence the position of float 17 which in turn opens valve 9 and allows a larger quantity of cooling liquid to flow through the reflux condenser 6, thereby increasing the amount of condensation and raising the head of liquid in chamber 13. The rate of refluxing which takes place is primarily dependent, as has been said before, upon the setting of the valve 16 which allows the liquid from chamber 13 to flow into the lower chamber 14. The wider the valve 16 is opened, the higher will be the rate of reflux return. A certain quantity of liquid in chamber 13 always passes into the chamber 14 through the opening 24 (if said opening is desired or formed in the partition 12) so that the valve 16 functions merely as a trimming valve. It is understood, of course, that the liquid present in chamber 14 passes through line 21 into the chamber 20 and then is discharged into the refluxing zone 1 through pipe 22.

The method of fractionation which is self-evident from the above description has special application to the fractionation or rectification of light oils which contain fractions too volatile to permit the oils to be stored or handled with safety. One example of liquids of this class is casing-head gasoline. If the above described apparatus and method were to be used in the rectification of casing-head gasoline, raw casing-head gasoline would be pumped into the system through the line 2 and the rectified gasoline would be withdrawn through the line 3. Undesirable volatile fractions of the feed would be eliminated through line 19 and a constant quantity of condensate from the reflux condenser 6 be returned through the chambers 13 and 14 and pipe means 21 and 22 into the fractionating or rectifying column 1.

The above method and apparatus may also be used in connection with the reduction of heavier oils such as lubricating oils which it is desired to reduce to a given flash point or viscosity. In this case it may be desirable to substitute a shell still set in a furnace for the heating coil 14, and it may also be desirable to run the entire system at a pressure materially lower than atmospheric. In general, however, the operation of the reflux control and the advantages derived therefrom will be the same, no matter whether the stock to be rectified is a very low boiling point gasoline or a high boiling point lubricating oil stock.

The automatic flow regulating device shown in Figure 1 and described above illustrates one of several possible forms which it may take. For example, instead of the drum 11 being divided into two compartments as shown by a substantially horizontal partition 12, I may make use of two separate vessels connected by a liquid flow pipe 15 and means for equalizing pressure corresponding to pipe 18, or a single vessel may be used having a vertical partition instead of the horizontal partition 12 as shown. A modification of this device is shown in Figure 2 in which a vertical partition is illustrated and the liquid caused to flow from the first compartment to the other through a weir of suitable form. These and other modifications may be employed when desired so long as the principle of the invention is utilized, namely, a substantially constant head of liquid is maintained in the first vessel or compartment with reference to the second and a pressure equalizing conduit or communicating passageway which serves to secure equality of pressure in the two compartments is used.

As shown in Fig. 2, the condensate may be admitted by line 10a into a housing 11a, said housing being provided with a partition 26 which may be adjustable. The partition 26 may divide the housing 11a into two chambers 13a and 14a corresponding to the chambers 13 and 14 of the device illustrated in Fig. 1. The float chamber 17a may be in communication with the chamber 13a, said float chamber 17a containing the float 17 connected by suitable linkage with a valve 25 in the line 10a. Variations in quantity of condensate in the chamber 13a will thus control the opening and closing of valve 25, thereby directly regulating the flow of condensate into the housing 11a and out of the chamber 14a back into the vaporizing zone as by means of line 20a which is an equivalent of the line 21, chamber 20 and line 22 used in Fig. 1.

In the foregoing description stress has been laid especially upon the use of the apparatus in connection with the fractionating process operated to produce a product of constant quality from the bottom of a recifying column, that is, one in which the condition which primarily controls the operation has to do with the product leaving the base of the apparatus as a liquid. The utility of the invention is not limited to processes of this class but may also be applied with advantage to rectifying operations where a product of constant quality is taken off the top of the column.

It will be readily understood that the apparatus described may be applied to any case where it is desired to obtain a constant liquid flow. The principle is exactly the same and the only difference that will exist will be in that the float, instead of controlling the flow of cooling medium to a condenser, may control the flow of the liquid directly as shown in Figure 2 or any material governing that flow, for example, the flow of heating lquid used in vaporizing another liquid or the flow or quantity of combustible matter fed to a still or heating chamber operably connected with means for creating vapors which are later condensed.

Numerous changes and modifications may be made therefore, and the method and apparatus used in a large number of operations without departing from the invention hereinabove described, the following claims not being limited to the specific examples hereinbefore recited but embracing all modifications and changes within their scope.

I claim:

1. A method of fractionating liquids comprising, vaporizing a portion of the liquid, condensing a portion of the evolved vapors, collecting the condensed liquid in a chamber, discharging the condensed liquid into a second chamber maintained at substantially the same pressure as the first chamber, controlling the condensing operation by variation in the quantity of liquid in said first chamber and returning a predetermined quantity of condensed liquid from the second chamber to be revaporized.

2. A method of fractionating petroleum oils comprising, continuously vaporizing a portion of the oil, condensing a portion of the evolved vapors, collecting the condensed oil in a chamber, separating uncondensed vapors from the condensed oil, continuously discharging a predetermined quantity of the condensed oil from the first chamber into a second chamber maintained at substantially the same pressure as the first chamber, continuously returning a predetermined quantity of condensed oil from the second chamber to be revaporized, and allowing the variation in quantity of oil remaining in said first chamber to control the condensing operation so as to maintain the return of condensed oil for revaporization substantially uniform in quantity.

3. In a method of rectification and fractional distillation, the steps of continuously vaporizing a portion of a liquid in a vaporizing zone and passing the vapors into a condensing zone, passing a cooling fluid through said condensing zone to condense the vapors therein, continuously collecting the condensate so produced, continuously separating a predetermined quantity of condensate from the collected condensate, returning the separated predetermined quantity of condensate to the vaporizing zone, and controlling the passage of cooling fluid through said condensing zone in accordance with variation in the quantity of condensate remaining after separation and return of said predetermined quantity.

4. In a method of fractional distillation of a liquid, the steps of continuously vaporizing a portion of a liquid in a vaporizing zone, subjecting the evolved vapors to condensing conditions in a condensation zone, collecting the condensed liquid, separating uncondensed vapors from the condensed liquid, withdrawing condensate at a predetermined rate from the condensate collected and returning said withdrawn condensate to the vaporizing zone, and controlling conditions in the condensation zone by variations in quantity of collected condensate so as to automatically maintain a substantially constant condensation rate and a substantially constant quantity of collected condensate.

5. A method of fractional distillation of a liquid comprising continuously vaporizing a portion of the liquid in a vaporizing zone, condensing the vaporized portion to form a body of condensate, withdrawing from said body a predetermined quantity of said condensate and revaporizing said withdrawn condensate in the vaporizing zone, and controlling the condensation of the vaporized portion of the liquid in accordance with variation in quantity of said body so as to permit the substantially continuous and uniform withdrawal of condensate, from said body, to be revaporized.

6. A method of fractional distillation of a liquid comprising continuously vaporizing a portion of a liquid in a vaporizing zone, condensing condensible components of the vaporized portion to form a body of condensate, separating uncondensed vaporized components from the condensate, withdrawing from said body a predetermined quantity of said condensate and returning said predetermined quantity to the vaporization zone, and controlling the condensation of the vaporized portion in accordance with variation in quantity of said body so as to permit substantially continuous and uniform withdrawal of condensate from said body to said vaporizing zone.

7. In a method of rectification, the steps of automatically varying the condensing rate so as to produce a substantially uniform quantity of reflux by condensing portions of a liquid vaporized in a rectifying system, forming a body of said condensed portions, continuously withdrawing a predetermined amount of condensate from said body for reflux purposes, and automatically varying the condensing rate by variation in the quantity of said body remaining after said withdrawal.

8. A method of fractionating liquids comprising vaporizing a portion of a liquid in a vaporizing zone, condensing a portion of the evolved vapors, collecting the condensed liquid so as to form a body thereof, discharging a portion of the condensed liquid of said body into a second body maintained at substantially the same pressure as the first body, returning the condensed liquid from the second body to the vaporizing zone, and controlling the condensing operation in accordance with variation in the quantity of liquid in said first body.

9. A method of fractionating petroleum oils comprising continuously vaporizing a portion of the oil in a vaporizing zone, condensing a portion of the evolved vapors, collecting the condensed oil to form a body of condensate, separating uncondensed vapors from the condensed oil, discharging a predetermined quantity of the condensed oil from the body of condensate into a second body, maintaining the two bodies of condensed oil at substantially the same pressure, continuously returning a predetermined quantity of condensed oil from the second body to the vaporizing zone, and controlling the condensing operation in accordance with variation in the quantity of condensate remaining in said first body.

10. In a method of fractional distillation, including the steps of continuously vaporizing a portion of a liquid in a vaporizing zone and condensing a portion of the vaporized liquid, the steps of collecting the condensed liquid to form a body of condensate, continuously withdrawing a substantially uniform quantity of condensate from said body and revaporizing said withdrawn condensate in the vaporizing zone, and maintaining said body of condensate substantially constant to permit said continuous withdrawal by regulating the condensing operation by variations in quantity of condensate in said body.

ALOIS KREMSER.